H. A. STONE.
Cheese Hoop.
No. 31,834. Patented March 26, 1861.
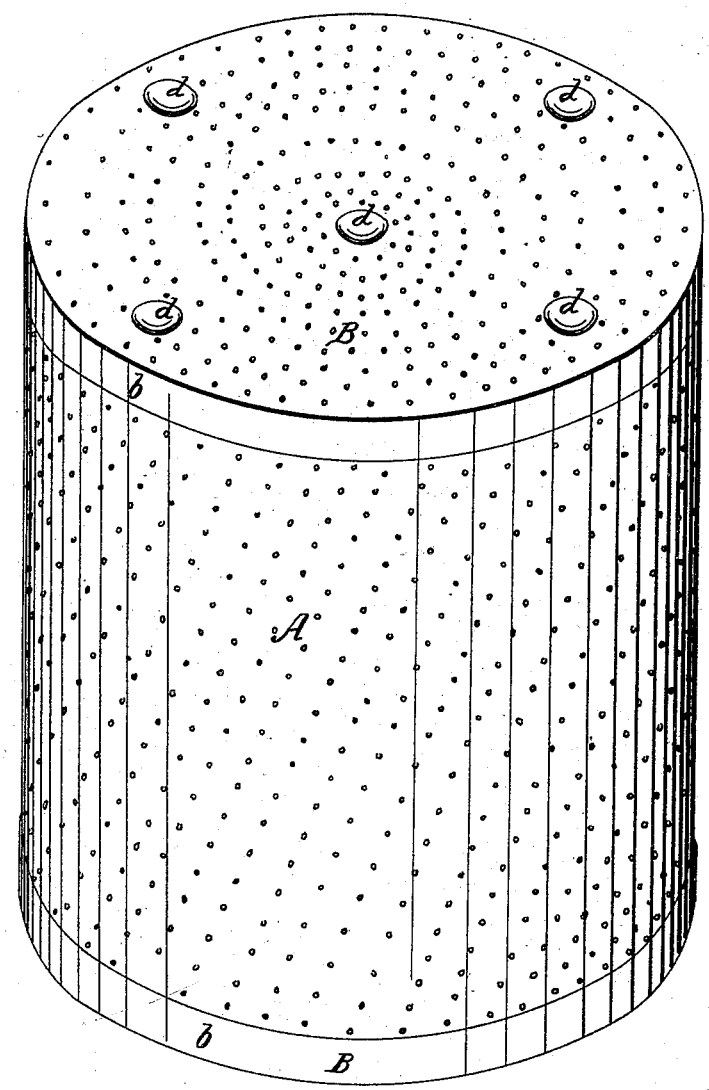
Witnesses:
Inventor:

UNITED STATES PATENT OFFICE.

HORACE A. STONE, OF BATTLE CREEK, MICHIGAN.

PRESSING CHEESE.

Specification of Letters Patent No. 31,834, dated March 26, 1861.

*To all whom it may concern:*

Be it known that I, HORACE A. STONE, of Battle Creek, in the county of Calhoun and State of Michigan, have invented a new and Improved Mode for Pressing Cheese; and I do declare that the following is a full and exact description thereof, reference being had to the accompanying drawings and to the letters of reference marked thereon.

The nature of my invention consists in providing a perforated cylinder, marked A, on the drawings, with a perforated head, marked B, B, at each end of the cylinder, so constructed as to shut over the end of the cylinder by means of a rim, marked $b$, $b$, and which forms a part of the head, which is also provided with feet, marked $d$, $d$, $d$, $d$, $d$ for the purpose of raising the head sufficiently from the shelf or stand to allow the whey to pass off freely. Then the curd being prepared by any known process is placed within the cylinder A which is set upright in its lower head, the upper head being placed on the cylinder, the whey is allowed to drain through the head and cylinder until the lower end of the curd is formed, then by reversing the cylinder on the other head, and turning the cheese over with the cylinder and again allowed to remain a sufficient time, and the change being thus repeated, is by its own weight in due time sufficiently pressed, and thereby saving the virtue of the cheese which is otherwise forced out by a heavy pressure.

What I claim as my invention and desire to secure by Letters Patent is—

The perforated cylinder A, in connection with the perforated heads, B, B, provided with legs $d\ d\ d\ d\ d$ operating substantially as described and for the purpose set forth.

H. A. STONE.

Attest:
 THEODORE BURR,
 M. F. BOULT.